Sept. 5, 1967
R. L. WHITMAN
3,340,523
SEAT-BELT SAFETY SYSTEMS
Filed Oct. 14, 1964
2 Sheets-Sheet 1
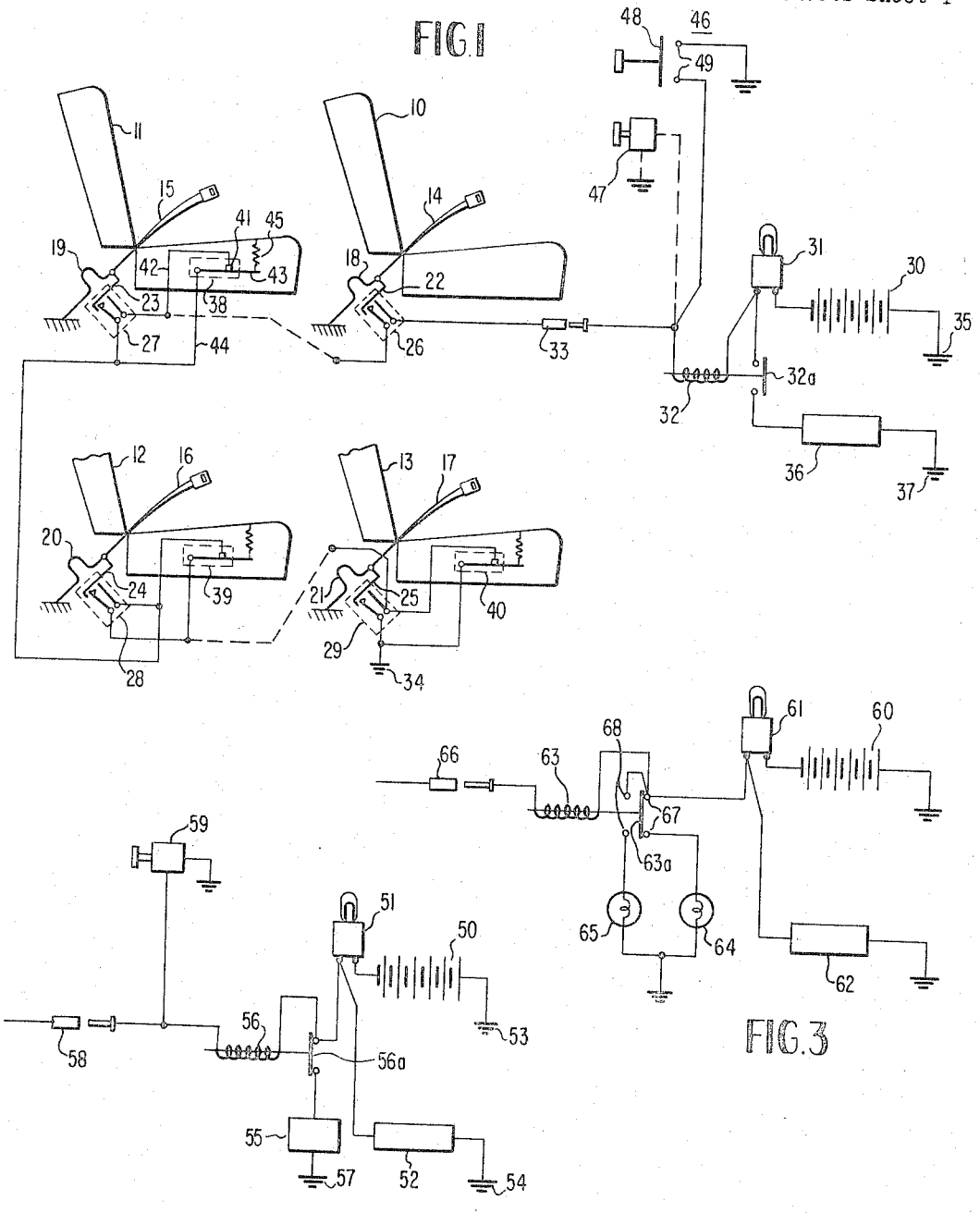

Sept. 5, 1967   R. L. WHITMAN   3,340,523
SEAT-BELT SAFETY SYSTEMS
Filed Oct. 14, 1964   2 Sheets-Sheet 2
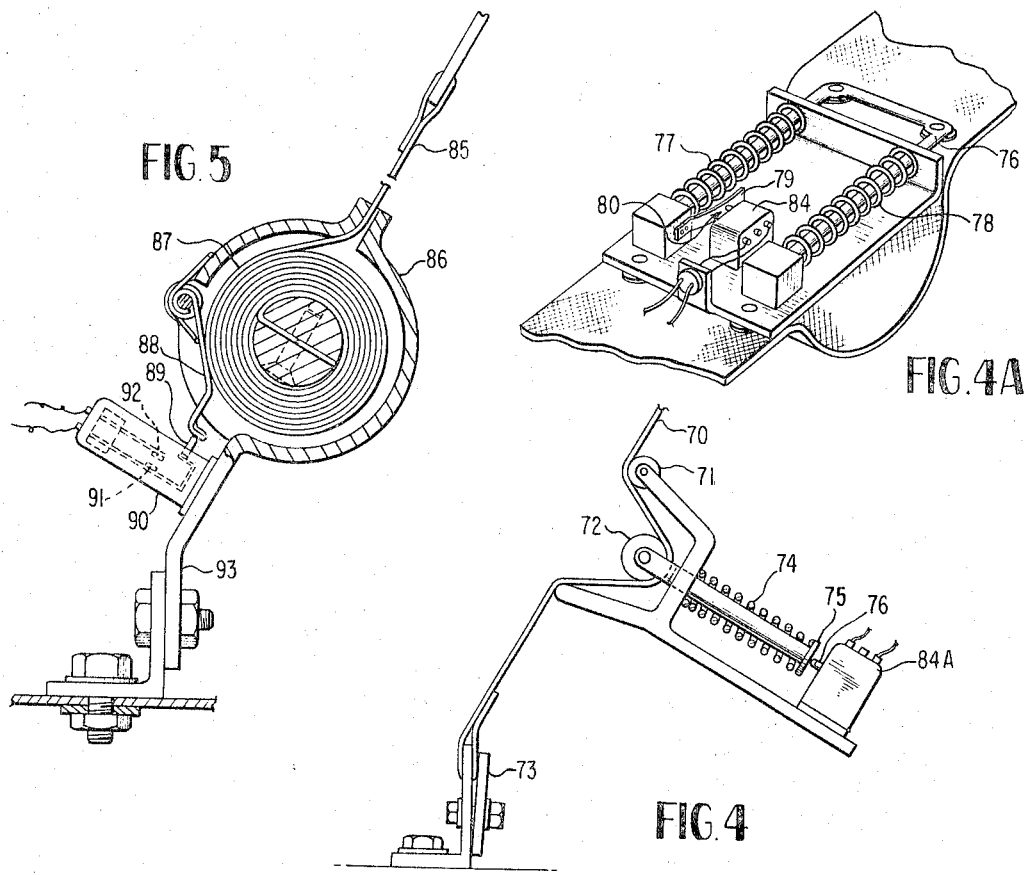
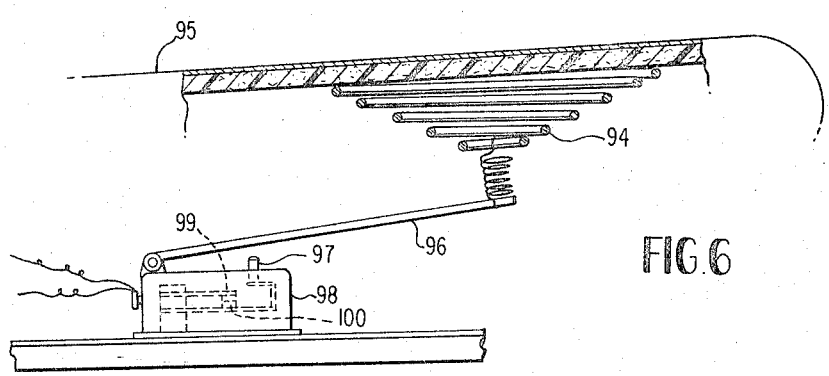
INVENTOR.
ROBERT L. WHITMAN
BY
ATTORNEYS

United States Patent Office 3,340,523
Patented Sept. 5, 1967

3,340,523
SEAT-BELT SAFETY SYSTEMS
Robert L. Whitman, 9145 SW. 80th Ave.,
Miami, Fla. 33156
Filed Oct. 14, 1964, Ser. No. 403,727
5 Claims. (Cl. 340—278)

This invention relates generally to vehicle safety systems and in particular to seat-belt safety systems as employed in motor vehicles, airplanes, and the like.

Prior systems in this art have been directed along several lines, e.g., some systems provide for ignition cutout in the event of a collision, others have taught indicating means in the event that the seat belts in an automobile have not been fastened, and still others have disclosed means to render the ignition circuit of a fast moving vehicle inoperative until all of the seat belts within the vehicle are fastened. Most of these prior systems teach the inclusion of conductive members within the seat belt itself where the clasp of the seat belt is used as a switch.

These systems are operative only in the event that all seat belts in the vehicle have been closed. This means that if the driver is operating the vehicle by himself that he necessarily must close all seat belts in the vehicle in order to either render the ignition circuit operative or to disable an alarm device.

It is a general object of this invention to provide a seat-belt safety system of the ignition cutout kind where the control of the ignition circuit is effected by means located at each seat equipped with a seat belt.

It is an object of this invention to provide a seat-belt safety system having means to indicate the operating condition of individual seat belts within a vehicle corresponding to seats occupied by passengers within the vehicle.

Another object of the invention is to provide a safety system that may be installed in fast moving vehicles presently equipped with seat belts or which may be installed as original equipment in such vehicles.

Still another object of the invention is to provide a safety system for seat belts that will in one embodiment of the invention act as a disabling device for the ignition circuit of the vehicle and in another embodiment of the invention will act as an alarm activating device for a vehicle in the event that the seat belts in the vehicle are not fastened to a proper degree of tension for the protection of the user of the belt.

Still another object of the invention is to provide a safety system for use in conjunction with seat belts where the system is individually activated by the users of the separate seat belts.

Still another object of the invention is to provide a safety system for seat belts in vehicles that is fool-proof in operation, low in cost, and simple in construction.

These together with other objects and advantages will become readily apparent from a study of the appended drawings and subsequent description. The accompanying drawings show preferred illustrative embodiments of the invention, in which:

FIGURE 1 is a wiring diagram of an ignition cutout circuit as applied to the seats of the vehicle;

FIGURE 2 is a wiring diagram of an audio alarm system to be substituted for the ignition cutout portion of the circuit shown in FIGURE 1;

FIGURE 3 is a visual alarm system to be substituted for the ignition cutout portion of the circuit shown in FIGURE 1;

FIGURE 4 is a side elevation of a spring-loaded, seat-belt operated micro-switch used in one embodiment of the invention;

FIGURE 4a shows a second embodiment of the spring-loaded, seat-belt operated micro-switch;

FIGURE 5 is a side elevation of a spring-loaded seat-belt operated micro-switch used in a third embodiment of the invention; and FIGURE 6 is a side elevation of a pressure operated micro-switch used in one embodiment of the invention.

Referring now to FIGURE 1, numerals 10, 11, 12 and 13 represent four passenger seats in a vehicle having seat belts 14, 15, 16 and 17 respectively at each of the passenger seats. Each seat belt is anchored to the floor of the vehicle through its respective spring member 18, 19, 20 and 21. In FIGURE 1 the inner connection of the seat belt spring and tie-down has been represented in schematic form as a series mechanical connection; each seat belt is in mechanical communication with its respective spring member which in turn, is secured to the floor of the vehicle. A more detailed description of suitable mechanical connections will be given below with respect to FIGURES 4 and 5. Each spring 18, 19, 20 and 21 is mechanically connected to the operating arms 22, 23, 24 and 25 respectively of the micro-switches 26, 27, 28 and 29.

It will be understood that the showing in FIGURE 1 is quite diagrammatic, and no attempt has been made to show all the details of the seat belts and the manner in which the belts are anchored to the vehicle floor. For example, the belts usually are made of two sections joined together by a releasable buckle, and both ends of the belt are anchored to the vehicle floor. FIGURE 1 shows only the arrangement for anchoring one end of each belt, since the other end need not be provided with the same type of anchoring arrangement or with a control switch.

When an individual desires to use one of the seats 10, 11, 12 and 13, and straps himself in with the respective seat belt, the belt must be pulled against the respective spring 18, 19, 20 or 21, thus causing the selected switch operator to act upon the contacts of the respective switch.

It should thus be obvious that the mere picking up of a belt and fastening it around a person occupying one of the seats will not be sufficient in and of itself to operate a micro-switch. It is required, under this system, that the user or occupant of the seat fasten the seat belt around himself (herself) to a degree of tightness that will cause the belt to exert sufficient force against the spring in order to activate that belt's switch.

The micro-switches are shown as being connected in series with a single wire where they constitute one part of one loop of a series parallel circuit. The loop is comprised of a battery 30 connected in series with an ignition switch 31, a current relay 32, a plug 33, the micro-switch 26, 27, 28 and 29, and the frame grounds 34 and 35. An alternate loop would have the same components except that the switches 27 and 28 would be eliminated. The alternate loop would be used in a vehicle having only two seat belts.

The ignition circuit proper constitutes another loop of the series parallel circuit and consists of a battery 30, connected in series with an ignition switch 31, the normally opened contacts 32a of the current relay 32, any conventional ignition device 36, and a return through the grounds 37 and 35 to the opposite side of the battery.

In the preferred embodiment of the invention each of the passenger seats 11, 12 and 13 was equipped with a pressure operated switch 38, 39 and 40 respectively. Since each of these switches operates in the same manner, a description will be given only with respect to one of them.

The pressure operated switch 38 is shown in its normally closed position. When the switch is unoperated, it acts as a bypass around the micro-switch 27. The contact 41 of switch 38 is connected to one of the normally opened contacts of switch 27 through a conductor 42. The other contact 43 of the normally closed switch 38 is connected to the other contact of the normally opened switch 27.

Thus, it will be seen that if the seat 11 is unoccupied a short circuit consisting of the conductor 42, the contact 41 in a normally closed relationship with the contact 43 of switch 38 and the conductor 44 constitutes a short circuit around the normally open switch 27. The switch 38 will be opened in the event that a person occupies seat 11, in which event spring 45 will be compressed causing switch 38 to open its contacts 41 and 43. With the opening of the contacts 41 and 43 the short circuit around the switch 27 has been removed and it will be necessary for the occupant of seat 11 to now fasten his seat belt 15 in order to close the normally opened contacts of switch 27, thus completing a series circuit through the relay 32 to the battery 30.

It will thus be obvious that the ignition circuit of the vehicle cannot be rendered operative until all persons sitting in a seat equipped with seat belts have fastened their respective seat belts to a sufficient degree of snugness to close their respective seat belt switches; thus completing the circuit and energizing relay 32. When current flows through the relay 32, the relay contacts 32a will close, thus completing the circuit consisting of the battery, ignition switch, and the ignition circuits proper.

Two other features have been provided with this safety seat belt system for various purposes. It sometimes happens that it is necessary for an occupant or occupants of the vehicle to leave the vehicle for brief periods of time while it may be desired that the motor be continued in an operative condition. This contingency has been met in one embodiment of this invention by providing means to short circuit the normally open seat belt switches 26, 27, 28 and 29 by using either of the two switches 46 and 47.

The switch 46 is a manually operated switch connected to the current relay 32 and in parallel to the switches 26, 27, 28 and 29. By manually closing the contacts 48 and 49 of the switch 46, the entire safety seat belt system will be short circuited. In the preferred embodiment of the invention this switch was spring loaded, thus the driver had to hold the switch closed in order to keep from killing the motor.

An alternate proposal used in another embodiment of this invention included a timing switch 47 connected to the current relay 32 and in parallel to the switches 26, 27, 28 and 29. This switch was similar to the switch 46 except that it was automatic and could be set for definite periods of time. The operator of the vehicle need only turn the dial on the switch, thus, for example, causing a spring to be wound which spring when it completely unwinds will once again open the switch 47 restoring the safety seat belt system.

These switches were considered desirable in order that short deliveries might be made or that passengers might be loaded or discharged without the inconvenience of killing the motor in the short time intervals involved in the aforementioned activities.

A second embodiment of this invention is shown in FIGURE 2. In this case, the safety seat belt system does not provide for ignition cutout or the prevention of ignition operation at start-up, rather it provides an audible signal in the event that any one of the seat belts 14, 15, 16 and 17 is not connected when an occupant is in one of the seats 10, 11, 12 and 13. The ignition circuit once again consists of the battery 50, the ignition switch 51 and a block representing the ignition circuits proper 52, all connected in series and having ground returns 53 and 54. A buzzer 55 is connected in series with the normally closed contacts 56a of a current relay 56 and is connected in parallel to the block representing the ignition circuits proper. Thus, it will be seen that as long as the contacts 56a are closed and the ignition switch 51 has been operated, the buzzer 55 will sound an audible signal. This signal will be cut off when the circuit consisting of the current relay 56, plug 58 and heretofore described series circuit consisting of the switches 26–29 is closed. In that event, current will flow in the relay 56 opening the relay contacts 56a and disconnecting the buzzer 57 from its source of supply 50. In all other respects, this embodiment of the invention is similar to the circuit heretofore described for the ignition cut out system.

A third embodiment of the invention contemplates the use of visual signals to indicate the operative condition of seat belts in those seats occupied by persons riding in the vehicle. Referring now to FIGURE 3, the usual ignition circuit consisting of the battery 60, ignition switch 61 and a block representing the ignition circuits 62 is shown connected in parallel to a visual indicating circuit consisting of the double-pole single-throw contacts 63a of the current relay 63 and the indicating lamps 64 and 65. As shown, the contacts 63a are making with the contacts 67, thus allowing current flow through the lamp 64. This lamp can be of any color although in the preferred embodiment of the invention the color was red indicating an unsafe condition; namely, the fact that some seat belt 14, 15, 16 or 17 of a seat occupied by a rider has not been fastened. In the event that all the seat belts are fastened in those seats occupied by riders, then a circuit will be completed activating the current relay 63, thereby causing the contact 63a to make with the contact 68. When the contact 63a closes with the contact 68 a current circuit will be established through the lamp 65 thus causing this lamp to glow. In the preferred embodiment of the invention, the lamp 65 will give off a green colored light, thus indicating that all the required seat belts are fastened. The circuit after the plug 66 which has been shown in an open position, although in use will be closed, is exactly the same as the circuit shown in FIGURE 1.

Referring now to FIGURES 4 and 5, two embodiments of seat belt micro-switches corresponding to the switches 26, 27, 28 and 29 are shown. In FIGURE 4 a seat belt 70 corresponding to any of the seat belts 14, 15, 16 and 17 in FIGURE 1 is threaded over a roller 71 and a spring biased roller 72 and is tied down to the floor of the vehicle in a conventional manner with a conventional tie-down 73. The switch has been shown in its conventional manner, thus it is assumed that the belt 70 has not been fastened around a rider occupying one of the seats equipped with this belt. When an occupant does fasten the belt around himself (herself), the belt 70 will move over the rollers 71 and 72 and in so doing will force the roller 72 outward against the spring 74. If the belt is fastened to the proper amount of tension, the plunger 75 will release pressure from the micro-switch 84A closing its contacts.

Referring to FIG. 4A, a second embodiment of the seat-belt safety switch is shown. In this example, fastening the seat belt will pull the slide bar 76, compressing springs 77 and 78 and moving the slide bar arm or follower 79 in an upward direction. Movement of the bar 76 will take the follower 79 from physical contact with the nipple 80, operating the electrical switch 84, thus closing this part of the series circuit. In the event that the seat belt is unbuckled the compression springs will restore the switch 84 to its normally opened state by reversing the above-described procedure.

A third embodiment of the seat-belt safety switch is shown in FIGURE 5. In this case the seat belt is of the roll-up type. The seat belt 85 is rolled and stored within the container 86 when the seat belt is not in use. When the seat belt is not fastened or not in use, it is fully rolled as shown at 87, in which case it causes spring 88 to act on the trigger 89 of the micro-switch 90. Thus, in this position, the contacts 91 and 92 of the micro-switch 90 are held open under the force of the spring 88. It is understood that the spring 88 will not release the trigger 89 until the seat belt is fastened to some predetermined proper degree of snugness around the user of the seat. A normal tie-down 93 is shown bolted to the floor boards of the vehicle.

Now referring to FIGURE 6, one embodiment of the switching arrangement contained within the horizontal portion of the seats of the vehicle is shown. It will be remembered that this switch was employed for the purpose of bypassing the normally open switch connected with the seat belt in the event that the seat was not occupied.

A spring member 94 is located under the horizontal portion of the seat 95 in such a manner that it will be depressed when a person occupies the seat. Depression of the spring 94 will cause the arm 96 to actuate the trigger 97 of the mirco-switch 98. Actuation of the trigger 97 will cause the normally closed contacts 99 and 100 of the micro-switch 98 to open, thereby removing the short circuit around the normally opened contacts of the seat belt switch.

The operation of this invention is believed obvious from the foregoing description, however, a summary of operation will be given with respect to FIGURE 1 it being understood that either of the alternative embodiments of the invention as represented by FIGURES 2 and 3 could be used in place of the ignition cutout circuits shown in FIGURE 1. The alternative embodiments of this invention are not meant to be exclusionary in that it is understood that many changes may be made within the spirit of this invention.

Assuming the driver and an occupant for seat 13 have entered the vehicle and that the plug 33 has been closed, as in all cases the plug will be closed once this system is installed in a vehicle, the driver will operate the ignition switch 31. The ignition circuit will only be completed in the event that the seat belts 14 and 17 have been fastened to a proper degree of snugness around the occupants of the seats 10 and 13. If the seat belts have been fastened, then the series circuit consisting of the relay 32, the plug 33, the normally opened but now closed contacts of the switch 26 and the normally opened but now closed contacts of the switch 29 will all be closed, thus causing the relay 32 to be energized closing the contacts 32a of the relay 32 allowing the ignition circuit to be energized.

The circuit above-described used the alternate wiring where the car is only equipped with two sets of seat belts, namely, seat belts in the driver's seat and the right-hand occupant's seat. In the event that seat belts are equipped in all four seats of the vehicle, then the circuit would have been completed as follows: from the relay 32 to the plug 33 and the normally opened but now closed contacts of the switch 26 to the normally opened contacts of the switch 27. At this point this seat is not occupied, therefore, the seat belt is not fastened and, therefore, the contacts 27 of the relay 32 are opened. However, a circuit is completed through the normally closed contacts of switch 38 located in the horizontal portion of the seat 11 through the conductor and down to the normally opened contacts of the switch 28. Again, since seat 12 is not occupied and since the seat belt 16 is not fastened, the normally opened contacts of switch 28 are open. The by-pass is made through the switch 39 located in a horizontal portion of the seat 12 and from there the circuit is series connected to the switch 29 where if the seat belt 17 is fastened then the circuit returns to ground and is completed through switch 29.

This invention provides a system of control of seat belts so that they must be fastened in order to operate the vehicle, or at best, in the audio or visual systems the seat belts must be fastened because the occupants of the seats want to fasten them. It is to be understood that this system can be adapted to all existing seat belts in all existing vehicles and to new seat belts in newly manufactured vehicles.

It is also apparent that this system can be adapted to use with an aircraft whereby the same switches are utilized to provide an indication to a hostess that an occupant of one of the seats has not fastened his seat belt during take off, landing and emergency situations, by simple single wire circuitry with an indicating lamp at each seat and/or an indicator panel at a central location.

It should, of course, be understood that the description and drawings herein are illustrative merely and that various modifications and changes may be made in the structure disclosed without departing from the spirit of the invention.

I claim:
1. A safety system for vehicles having at least two seats equipped with seat belts and a normally closed signaling circuit; a control circuit for effecting the opening of said normally closed signaling circuit comprising normally opened switch means controlled by each seat belt and connected in series circuit relation; a seat belt switch actuator in operative engagement with each of said seat-belt switches; spring means operatively associated with said actuator and with said seat belt such that the force of said spring means maintains said actuator in position to hold said seat belt switch normally open, said switch being closed in response to a sufficient force exerted on said seat belt to overcome the force of said spring means; a normally-closed pressure-operated switch means mounted to be moved to open position in response to pressure applied to one of the seats, said normally-closed pressure-operated switch being connected in parallel with the corresponding seat belts switch; and a normally opened operator actuated time dependent shorting means, said shorting means being connected in parallel with said control circuit for short circuiting said control circuit for a finite time interval and for automatically restoring said control circuit to the normal state after said time interval.

2. A safety system for vehicles having at least two seats equipped with seat belts comprising:
   a visual signaling circuit including at least two lamps, one for indicating that all seat belts are fastened and one for indicating that at least one seat belt associated with an occupied seat is not fastened;
   a single throw, double pole switch, the poles of said switch being connected in said signaling circuit such that when said switch is operated said lamp for indicating all seat belts as fastened is energized and when said switch is unoperated said other lamp is energized;
   a control circuit including a relay for operating said single throw, double pole switch comprising normally opened switch means controlled by each seat belt and connected in series circuit relation, each seat-belt switch being moved to its closed position upon the fastening of the seat belt, a normally closed pressure operated switch means mounted to be moved to its open position in response to pressure applied to one of the seats, said normally closed pressure operated switch being connected in parallel with the corresponding seat belt switch, and an operator actuated timing means connected in parallel with said seat belt switches and said pressure operated switches for short circuiting said switches when actuated for a discrete time interval and for automatically removing said short circuit after said interval, said relay being connected in series with said timing means, said seat belt switches and said pressure operated switches.

3. A safety system for vehicles having at least two seats equipped with seat belts of the roll up type which when not in use are stored in a seat belt housing and having a normally closed signaling circuit comprising:
   a control circuit for effecting the opening of said normally closed signaling circuit including;
   a normally open switch for each of said seat belts supported contiguous of the associated seat belt housing said switches being connected in a series circuit;
   a coil spring supported by each of said housings, and operatively engaged with the associated seat belt and seat belt switch such that a predetermined force applied to said seat belt operates the associated switch to a closed position;
   a plurality of normally closed pressure operated switches, said pressure switches being individually connected in parallel with selected ones of said seat belt switches, said pressure switches being supported within said seats and operated by pressure applied to same; and a normally open, operator actuated time dependent shorting means electrically connected in parallel with said control circuit for short circuiting said control circuit for a finite time interval and for automatically restoring said circuit to the normal state after said interval.

4. A safety system for vehicles having at least two seats equipped with seat belts, each of said seat belts being provided with a bight, and a normally closed signaling circuit comprising:

a plurality of normally open seat belt switches, one each of said switches being associated with one each of said seat belts, said switches being electrically connected in series;

a slide bar secured to an outer surface of each seat belt on one side of said bight, said bar being slidably supported on a plate member secured to the same surface of the associated belt on the other side of said bight;

a pair of coil springs supported on said plate by said slide bar and adapted to be placed in compression when said seat belt is in tension;

a follower arm mounted on said slide bar for movement therewith, said seat belt switch being supported on said plate and in operative engagement with said follower arm such that a predetermined amount of motion of said follower arm operates said switch;

a plurality of normally closed pressure operated switches, said pressure switches being individually connected in parallel with selected ones of said seat belt switches, said pressure switches being supported within said seats and operated by pressure applied to same; and a normally open operator actuated time dependent shorting means electrically connected in parallel with said control circuit for short circuiting said control circuit for a finite time interval and for automatically restoring said circuit to the normal state after said interval.

5. A safety system for vehicles having at least two seats equipped with seat belts and a normally closed signaling circuit comprising:

a control circuit for effecting the opening of said normally closed signaling circuit including;

a plurality of normally open seat belt switches, one each of said switches being associated with one each of said seat belts, said switches being electrically connected in series;

a pulley means associated with each seat belt for forming a bight in each of said seat belts;

a coil spring including a plunger operatively engaged by said pulley means on one side and in operative engagement with an associated seat belt switch on the other side such that predetermined amount of tension on the associated belt disengages said spring to operate the associated seat belt switch;

a plurality of normally closed pressure operated switches, said pressure switches being individually connected in parallel with selected ones of said seat belt switches, said pressure switches being supported within said seats and operated by pressure applied to same; and a normally open operator actuated time dependent shorting means electrically connected in parallel with said control circuits for short circuiting said control circuit for a finite time interval and for automatically restoring said circuit to the normal state after said interval.

References Cited
UNITED STATES PATENTS

| | | | |
|---|---|---|---|
| 3,074,055 | 1/1963 | Rudolph | 340—278 |
| 3,112,467 | 11/1963 | Benning. | |
| 3,133,277 | 5/1964 | Hood | 340—278 |
| 3,226,674 | 12/1965 | Eriksson | 340—278 |
| 3,237,710 | 3/1966 | McDonald | 340—278 X |

NEIL C. READ, *Primary Examiner.*

R. M. GOLDMAN, A. WARING, *Assistant Examiners.*